US008320353B2

(12) United States Patent
Lee et al.

(10) Patent No.: US 8,320,353 B2
(45) Date of Patent: Nov. 27, 2012

(54) METHOD AND SYSTEM FOR ESTIMATING ADAPTIVE COMBINED CHANNEL IN CDMA SYSTEM BASED ON TIME DIVISION DUPLEX SYSTEM

(75) Inventors: Dong-Hahk Lee, Seoul (KR); Ra-Mi Lee, Seoul (KR); Seong-Soo Park, Seoul (KR); Sang-Shin Lee, Seoul (KR); Jae-Hwang Yu, Seoul (KR); Jong-Tae Ihm, Gyeonggi-do (KR); Duk-Kyung Kim, Incheon (KR)

(73) Assignee: SK Telecom Co., Ltd. (KR)

( * ) Notice: Subject to any disclaimer, the term of this patent is extended or adjusted under 35 U.S.C. 154(b) by 369 days.

(21) Appl. No.: 12/665,885

(22) PCT Filed: Jun. 19, 2008

(86) PCT No.: PCT/KR2008/003475
§ 371 (c)(1),
(2), (4) Date: Jan. 12, 2010

(87) PCT Pub. No.: WO2008/156313
PCT Pub. Date: Dec. 24, 2008

(65) Prior Publication Data
US 2010/0322116 A1    Dec. 23, 2010

(30) Foreign Application Priority Data
Jun. 19, 2007   (KR) .................. 10-2007-0059975

(51) Int. Cl.
*H04J 1/00*    (2006.01)
*H04J 3/17*    (2006.01)
(52) U.S. Cl. ....................................... 370/343; 370/433

(58) Field of Classification Search .................. 370/280, 370/335, 342, 433
See application file for complete search history.

(56) References Cited

U.S. PATENT DOCUMENTS

| | | | | |
|---|---|---|---|---|
| 5,828,658 | A * | 10/1998 | Ottersten et al. | 370/310 |
| 6,816,470 | B2 | 11/2004 | Kim et al. | |
| 7,428,228 | B2 * | 9/2008 | Jeong et al. | 370/335 |
| 7,711,030 | B2 * | 5/2010 | Perlman | 375/141 |
| 2006/0109806 | A1 | 5/2006 | Kwak et al. | |

FOREIGN PATENT DOCUMENTS
WO    01/58041    8/2001

OTHER PUBLICATIONS

Joint Detection for on/off Uplink Traffic in the TD-SCDMA System; Ji Young Yun, et al., IEEE Vehicular Technology Conference 2003—Spring, Apr. 22-25, 2003, pp. 1677-1680.

* cited by examiner

*Primary Examiner* — Kerri Rose
(74) *Attorney, Agent, or Firm* — Baker & Hostetler LLP

(57) ABSTRACT

Disclosed is a method and system for estimating an adaptive joint channel in a CDMA system based on TDD. The method includes the steps of a) receiving activity information of a mobile terminal; b) parsing the activity information, and transmitting a midamble sequence to the mobile terminal when a result of the parsing shows that the mobile terminal is in an ON state; c) conducting adaptive joint channel estimation by using the midamble sequence in the mobile terminal; and d) conducting adaptive joint detection by using a channel impulse response of the mobile terminal, obtained as a result of conducting the adaptive joint channel estimation. The method and system decreases the complexity in channel estimation and additionally increases the accuracy of channel estimation by reducing transmission power consumption and eliminating unnecessary interference.

7 Claims, 4 Drawing Sheets

METHOD AND SYSTEM FOR ESTIMATING ADAPTIVE COMBINED CHANNEL IN CDMA SYSTEM BASED ON TIME DIVISION DUPLEX SYSTEM

TECHNICAL FIELD

The present invention relates to a CDMA (Code Division Multiple Access) system based on TDD (Time Division Duplex), and more particularly to a method and system for estimating an adaptive joint channel in a CDMA system based on TDD, in which a midamble is transmitted only to an actual active user and joint channel estimation is conducted only for the active user in a DTX (Discontinuous Transmission) mode where data transmission is turned on/off, as in the case of voice, in a mobile communication system based on TDD.

BACKGROUND ART

Nowadays, due to the growth of the wireless communication industry, a mobile communication system has evolved into a system that can provide a mobile terminal with multimedia communication for transmitting/receiving relatively high-capacity data, such as packet data and multimedia data, as well as voice services.

Furthermore, in the multimedia communication, there is a tendency toward a higher traffic increase in downlink where data/signals are transmitted from a base station to a mobile terminal than in uplink where data/signals are transmitted from a mobile terminal to a base station.

In supporting systems for the multimedia communication, a time division duplex (hereinafter referred to as "TDD") scheme in which uplink and downlink are divided by time slots is more efficient than a frequency division duplex (hereinafter referred to as "FDD") scheme in which uplink and downlink are divided by frequencies.

A typical example of the FDD scheme is the IS-95A system or the IS-95B system using code division multiple access (hereinafter referred to as "CDMA"), and a typical example of the TDD scheme is a GSM (Global System for Mobile Communication) communication system using time division multiple access (hereinafter referred to as "TDMA").

Based on these $2^{nd}$ generation mobile communication systems, attempts to develop $3^{rd}$ generation mobile communication systems have been made all over the world. As a result of this, a wideband code division multiple access system and a cdma2000 system based on CDMA have been adopted as the international standard for the FDD scheme.

Also, a time division code division multiple access (hereinafter referred to as "TD-CDMA") system in which the existing TDMA is extended in such a manner that a plurality of code channels are assigned within a time slot has been adopted as the international standard for the TDD scheme.

The TD-CDMA system includes HCR-TDD (High Chip Rate-TDD) with a chip rate of 3.84 Mcps (cps=chip per second) and LCR-TDD (Low Chip Rate-TDD) with a chip rate of 1.28 Mcps.

The TD-CDMA system can use a maximum of 16 channelisation codes for each time slot. In the TD-CDMA system, a maximum of 16 code channels are used when a spreading gain within one time slot is 16, and less than 16 code channels are used when the spreading gain is less than 16.

In the existing CDMA system based on TDD, for example, in TD-SCDMA, signal detection performance has been enhanced using a type of multiple user detection scheme called joint channel estimation and joint detection.

In particular, DTX (Discontinuous Transmission) is used when ON and OFF intervals are repeated, as in the case of voice, and with regard to this, there has been proposed a method in which joint detection is used only for data of a user who actually transmits data. In this method, a midamble part for channel estimation is always transmitted regardless of whether a receiver is turned on or off, and only whether or not to transmit a data transmission part is determined according to ON/OFF states of the receiver.

Consequently, it is possible to reduce interference regarding the data transmission part, but there is a problem in that channel estimation is still affected by interference regarding the midamble part because the midamble part is transmitted, even when the receiver is turned off.

DISCLOSURE

Technical Problem

Accordingly, the present invention has been made to solve at least the above-mentioned problems occurring in the prior art, and an object of the present invention is to provide a method and system for estimating an adaptive joint channel in a CDMA system based on TDD, in which a midamble is transmitted only to an actual active user and joint channel estimation is conducted only for the active user in a DTX (Discontinuous Transmission) mode where data transmission is turned on/off, as in the case of voice, in a mobile communication system based on TDD.

A further object of the present invention is to provide a method and system for estimating an adaptive joint channel in a CDMA system based on TDD, which can reduce transmission power by not transmitting a midamble sequence as well as an unnecessary data part when a mobile terminal with a receiver mounted therein is turned off in a mobile communication network based on TDD.

A further object of the present invention is to provide a method and system for estimating an adaptive joint channel in a CDMA system based on TDD, which can eliminate unnecessary interference and improve the accuracy of channel estimation by determining whether or not to transmit a midamble sequence according to ON/OFF states of a mobile terminal in a mobile communication system based on TDD.

Technical Solution

In accordance with an aspect of the present invention, there is provided a method of estimating an adaptive joint channel in a CDMA system based on TDD, the method including the steps of a) receiving activity information of a mobile terminal; b) parsing the activity information, and transmitting a midamble sequence to the mobile terminal when a result of the parsing shows that the mobile terminal is in an ON state; c) conducting adaptive joint channel estimation by using the midamble sequence in the mobile terminal; and d) conducting adaptive joint detection by using a channel impulse response of the mobile terminal, obtained as a result of conducting the adaptive joint channel estimation.

Preferably, the method further includes the step of e) not transmitting the midamble sequence, and parsing updated activity information when a result of the parsing shows that the mobile terminal is in an OFF state.

Preferably, the midamble sequence is generated in time slots and codes that are assigned in order to spread data to be transmitted from a transmitter to the mobile terminal.

More preferably, in step d), the mobile terminal generates the channel impulse response by using the midamble sequence.

Also, preferably, channel information is provided by means of the channel impulse response in step d).

In accordance with another aspect of the present invention, there is provided a system for estimating an adaptive joint channel in a CDMA system based on TDD, the system including a transmitter for parsing activity information received from a receiver to determine whether or not the receiver is in an ON state, and transmitting a midamble sequence when the receiver is in the ON state; and the receiver for conducting adaptive joint channel estimation by using the midamble sequence.

Preferably, the transmitter does not transmit the midamble sequence when a result of the parsing shows that the receiver is in an OFF state.

Preferably, the receiver generates a channel impulse response by using the midamble sequence.

More preferably, the midamble sequence is generated in time slots and codes that are assigned in order to spread data to be transmitted from the transmitter to the receiver.

ADVANTAGEOUS EFFECTS

As described in the forgoing, the inventive method and system for estimating an adaptive joint channel in a CDMA system based on TDD reduce transmission power consumption and eliminate unnecessary interference by transmitting a midamble sequence only to an actual active user and conducting joint channel estimation only for the active user in a DTX mode where data transmission is turned on/off, as in the case of voice, in a mobile communication system based on TDD, which results in an increase in the accuracy of channel estimation and thus an improvement in system performance.

BRIEF DESCRIPTION OF THE DRAWINGS

The above and other objects, features and advantages of the present invention will become more apparent from the following detailed description taken in conjunction with the accompanying drawings, in which.

BEST MODE

Mode for Invention

Hereinafter, preferred embodiments of the present invention will be described with reference to the accompanying drawings.

Figure 1:
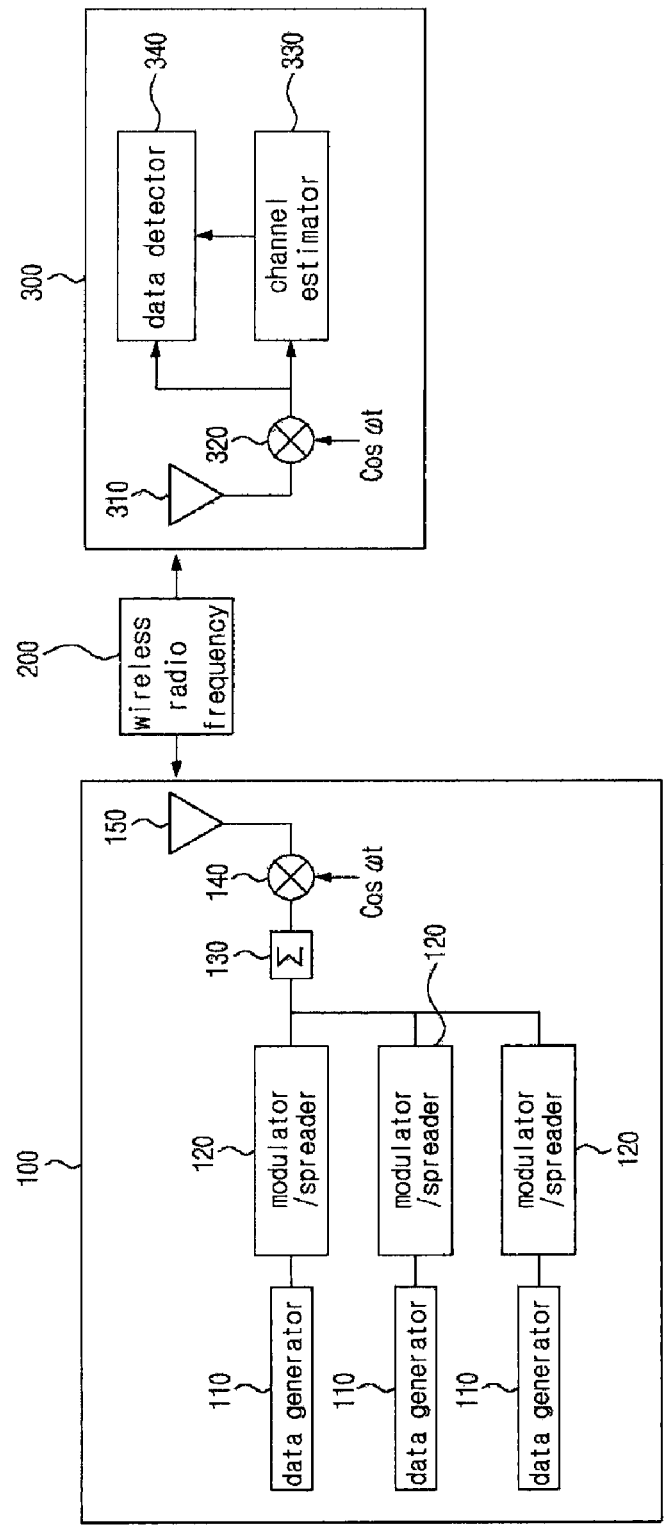
FIG. 1 is a block diagram schematically illustrating a system for estimating an adaptive joint channel in a CDMA system based on TDD in accordance with a preferred embodiment of the present invention.

FIG. 1 schematically illustrates a system for estimating an adaptive joint channel in a CDMA system based on TDD according to a preferred embodiment of the present invention.

Referring to FIG. 1, the system for estimating an adaptive joint channel in a CDMA system based on TDD includes a transmitter 100 and a receiver 300.

In an application example, the transmitter 100 is provided in a base station, and the receiver 300 is provided in a user equipment (UE), that is, a mobile terminal, but the scope of the present invention is not limited thereto.

In a CDMA system based on TDD, a midamble sequence or a training sequence that performs similar functions to those of a pilot channel used in the CDMA system is used for coherent reception.

The transmitter 100 transmits data to the receiver 300 over a wireless radio frequency 200. With regard to this, the data to be transmitted to the receiver 300 is transmitted in the form of K communication bursts.

A data generator 110 in the transmitter 100 generates data to be transmitted to the receiver 300, and a modulation/spreading sequence inserter 120 (hereinafter referred to as "modulator/spreader") generates K communication bursts by spreading data generated in the data generator 110 and making spread reference data time-multiplexed with a midamble training sequence in appropriately assigned time slots and codes for spreading the data. For a base station for transmitting downlink bursts, the value of K usually ranges from 1 to 16.

The communication bursts are coupled by a coupler 130, and are modulated into a radio frequency (RF) signal by a modulator 140. An antenna 150 radiates the RF signal to an antenna 310 of the receiver 300 over a wireless radio channel.

A modulation scheme used in transmitting the communication bursts may be any one of techniques well known in the art, such as binary phase shift keying (BPSK) or quadrature phase shift keying (QPSK).

The transmitter 100 having such a structure receives activity information from the receiver 300, and parses the received activity information to determine whether or not the receiver 300 is in an ON state.

The transmitter 100 transmits a midamble sequence to the receiver 300 when the receiver 300 is in an ON state.

However, when a result of parsing the activity information shows that the receiver 300 is in an OFF state, the transmitter 100 does not transmit the midamble sequence to the receiver 300.

The receiver 300 includes the antenna 310, a demodulator 320, a channel estimator 330, and a data detector 340.

The receiver 300 in a CDMA system based on TDD estimates a channel characteristic (impulse response) by using the midamble sequence, and based on the channel characteristic, eliminates inter symbol interference (hereinafter referred to as "ISI") due to multipath propagation and multiple access interference (hereinafter referred to as "MAI") caused by simultaneous communications between many users by means of a joint detector (hereinafter referred to as "JD") at a time.

More specially, the antenna of the receiver 300 receives various RF signals, and a signal received by the receiver 300 is demodulated by the demodulator 320, as a result of which a baseband signal is formed.

The baseband signal is processed into appropriate codes and time slots, which are assigned to transmitted communication bursts, by the channel estimator 330, the data detector 340, etc.

The channel estimator 330 provides channel information, such as a channel impulse response, by using the midamble training sequence component of the baseband signal.

The data detector 340 estimates data, which is carried in the form of the received communication bursts, as hard symbols by using the channel information provided by the channel estimator 330.

The receiver 300 having such a structure conducts adaptive channel estimation by using the received midamble sequence, and generates the channel impulse response by using the midamble sequence.

The midamble sequence is generated in time slots and codes that are assigned in order to spread data to be transmitted from the transmitter 100 to the receiver 300, that is, a mobile terminal.

Reference will now be made in more detail to the operation of the so-constructed system for estimating an adaptive joint channel in a CDMA system based on TDD according to the present invention.

Figure 2:
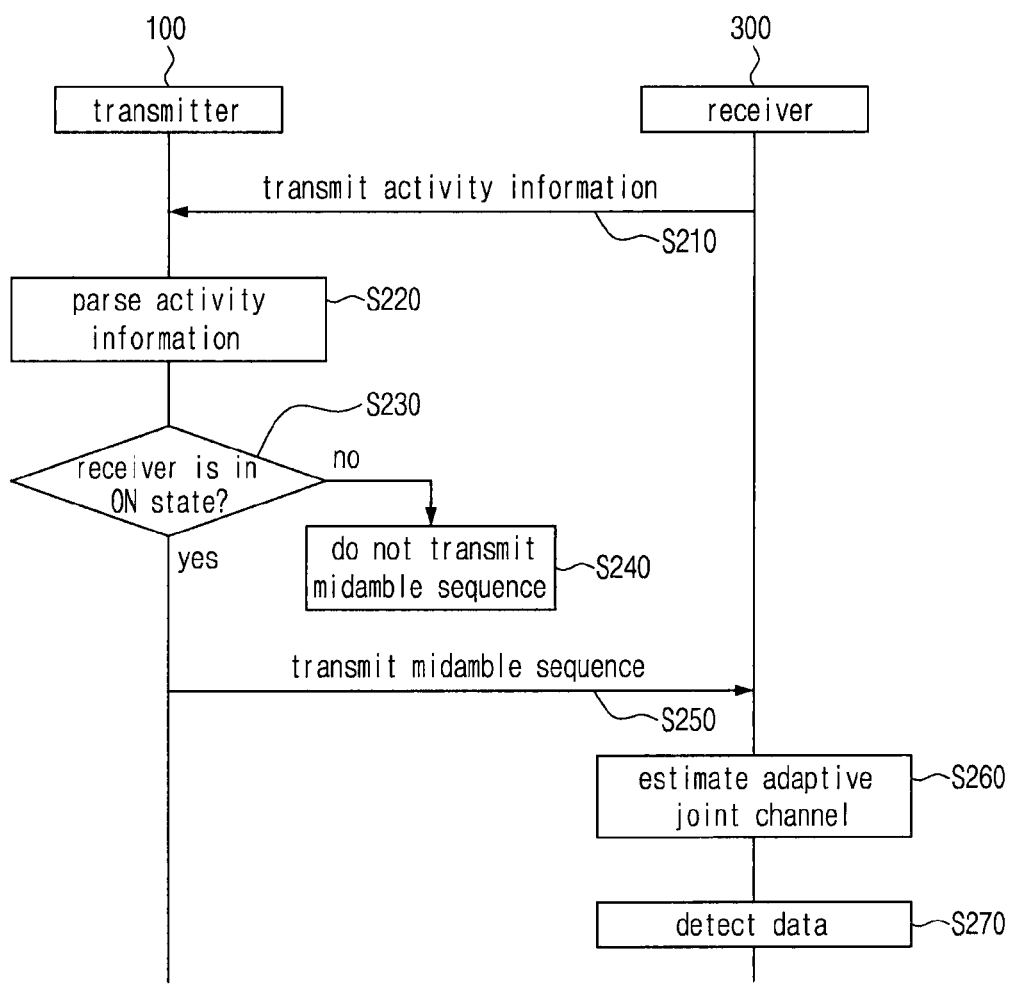
FIG. 2 is a flowchart for explaining a method of estimating an adaptive joint channel in a CDMA system based on TDD in accordance with a preferred embodiment of the present invention.

FIG. 2 illustrates a flowchart for explaining a method of estimating an adaptive joint channel in a CDMA system based on TDD according to a preferred embodiment of the present invention.

A transmitter 100 receives activity information of a mobile terminal with a receiver 300 mounted therein, and parses the activity information to transmit a midamble sequence to the mobile terminal when the mobile terminal is in an ON state (S210, S220, S230, S250).

Upon receiving the midamble sequence, the mobile terminal conducts adaptive channel estimation by using the midamble sequence (S260).

Adaptive joint detection is conducted using the channel impulse response (CIR) of the mobile terminal, obtained as a result of the adaptive channel estimation (S270). With regard to this, the mobile terminal generates the CIR by using the midamble sequence, and provides channel information by means of the CIR.

Also, the transmitter 100 parses the activity information received from the mobile terminal, and does not transmit the midamble sequence and parses updated activity information when the mobile terminal is in an OFF state (S240).

The midamble sequence is generated in time slots and codes that are assigned in order to spread data to be transmitted from the transmitter 100 to the mobile terminal.

Figure 3:
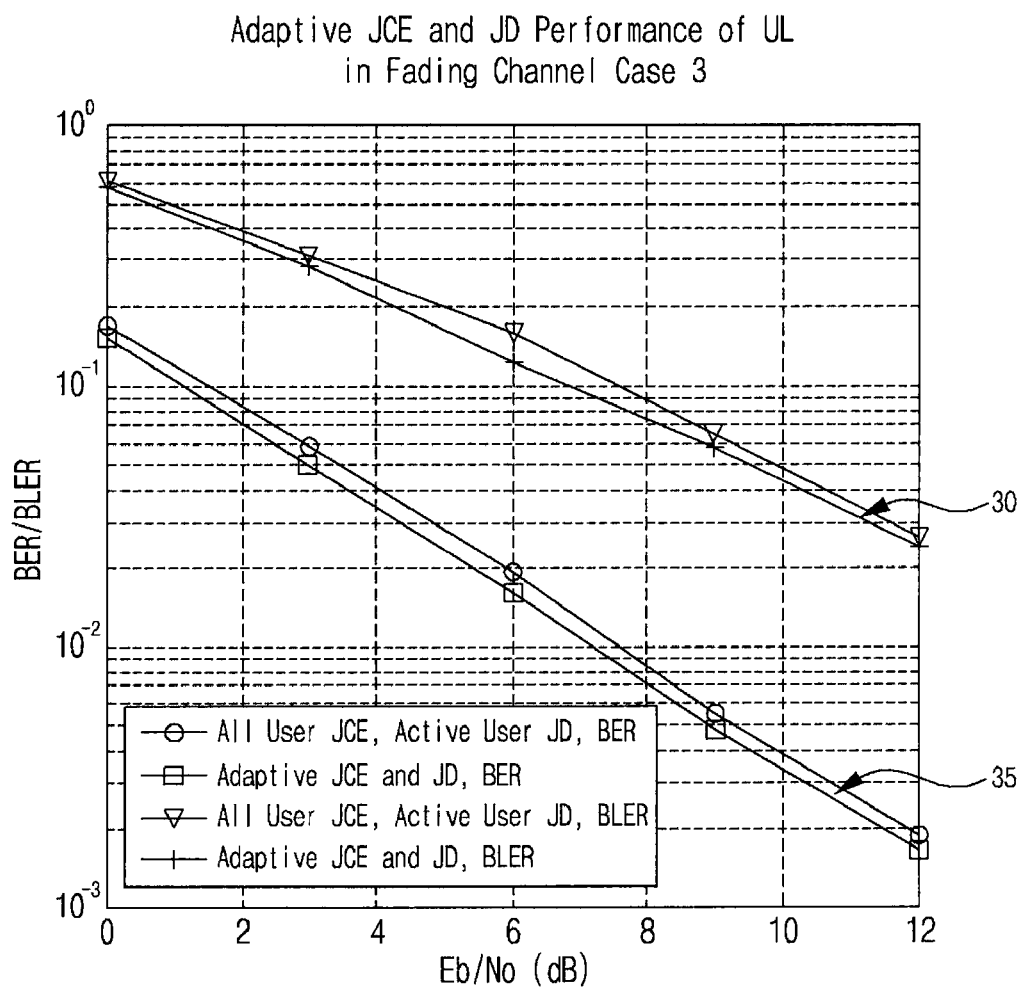
FIG. 3 is a graph illustrating performance in a single cell, to which a preferred embodiment of the present invention is applied, in comparison with that in the existing single cell.

FIG. 3 graphically illustrates performance in a single cell, to which a preferred embodiment of the present invention is applied, in comparison with that in the existing single cell.

Referring to FIG. 3, reference numeral "35" designates BER, and reference numeral "30" designates BLER. As illustrated in the drawing, it can be noted that, in the case of a single cell, gain is small because joint channel estimation has the ability to eliminate interference with other users in the cell.

Figure 4:
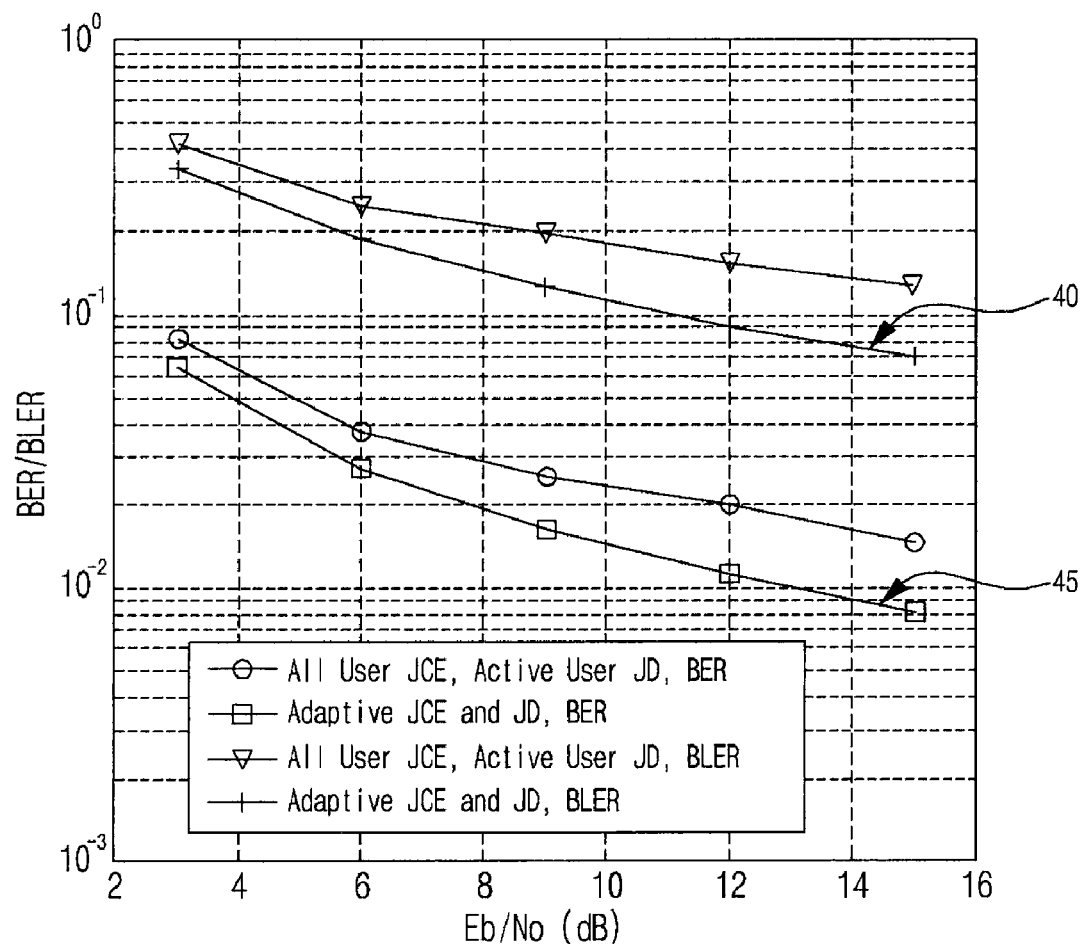
FIG. 4 is a graph illustrating performance in a multi-cell, to which a preferred embodiment of the present invention is applied, in comparison with that in the existing multi-cell.

FIG. 4 graphically illustrates performance in a multi-cell, to which a preferred embodiment of the present invention is applied, in comparison with that in the existing multi-cell.

Referring to FIG. 4, it can be noted that the effect of the proposed joint channel estimation scheme on a performance improvement amounts to several dB because interference from other cells is not eliminated in the joint channel estimation scheme, dissimilar to a single cell. Since a CDMA system based on TDD is actually operated in a cellular environment, performance is improved by applying the proposed scheme thereto.

Although preferred embodiments of the present invention have been described in detail for illustrative purposes, those skilled in the art will appreciate that various modifications, additions and substitutions are possible, without departing from the scope and spirit of the invention as disclosed in the accompanying claims.

The invention claimed is:

1. A method of estimating an adaptive joint channel in a CDMA system based on TDD, the method comprising the steps of:
   a) using a receiver for receiving activity information corresponding to the existence of an ON and an OFF state of a mobile terminal;
   b) parsing the activity information to determine whether or not the mobile terminal is in the ON state;
   c) transmitting a midamble sequence to the mobile terminal only when the mobile terminal is in an ON state;
   d) conducting adaptive joint channel estimation by using the midamble sequence in the mobile terminal; and
   e) conducting adaptive joint detection by using a channel impulse response generated by the mobile terminal in response to the adaptive joint channel estimation conducted in step (d).

2. The method as claimed in claim 1, further comprising the step of:
   f) not transmitting the midamble sequence and parsing updated activity information when a result of the parsing shows that the mobile terminal is in an OFF state.

3. The method as claimed in claim 1, wherein the midamble sequence is generated in time slots and codes that are assigned in order to spread data to be transmitted from a transmitter to the mobile terminal.

4. The method as claimed in claim 3, wherein channel information is provided by means of the channel impulse response in step e).

5. A system for estimating an adaptive joint channel in a CDMA system based on TDD, the system comprising:
   a transmitter for parsing activity information received from a receiver corresponding to the existence of an ON and an OFF state of a mobile terminal to determine whether or not the mobile terminal is in an ON state, and transmitting a midamble sequence to the mobile terminal only when the mobile terminal is in the ON state;
   wherein the receiver conducts adaptive joint channel estimation by using the midamble sequence in the mobile terminal; and
   wherein the receiver conducts adaptive joint channel direction using a channel impulse response in response to the adaptive joint channel estimation.

6. The system as claimed in claim 5, wherein the transmitter does not transmit the midamble sequence when a result of the parsing shows that the mobile terminal is in an OFF state.

7. The system as claimed in claim 6, wherein the midamble sequence is generated in time slots and codes that are assigned in order to spread data to be transmitted from the transmitter to the receiver.

* * * * *